(12) United States Patent
Mizukami et al.

(10) Patent No.: US 7,840,829 B2
(45) Date of Patent: Nov. 23, 2010

(54) POWER SUPPLY SYSTEM

(75) Inventors: Satoshi Mizukami, Hitachi (JP);
Shigeaki Namba, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1021 days.

(21) Appl. No.: 11/562,558

(22) Filed: Nov. 22, 2006

(65) Prior Publication Data
US 2007/0124619 A1    May 31, 2007

(30) Foreign Application Priority Data
Nov. 25, 2005    (JP)    .............................. 2005-340147

(51) Int. Cl.
G06F 1/28    (2006.01)
(52) U.S. Cl. ...................................... 713/340; 713/300
(58) Field of Classification Search ................. 713/300, 713/310, 340; 714/2, 14, 25; 361/78, 103
See application file for complete search history.

(56) References Cited

U.S. PATENT DOCUMENTS

| | | | |
|---|---|---|---|
| 6,865,685 B2 * | 3/2005 | Hammond et al. | 713/340 |
| 7,036,035 B2 * | 4/2006 | Allison et al. | 713/340 |
| 2003/0033550 A1 * | 2/2003 | Kuiawa et al. | 713/340 |
| 2005/0237023 A1 * | 10/2005 | Zhang | 320/128 |

FOREIGN PATENT DOCUMENTS

| | | |
|---|---|---|
| JP | 10-14136 | 1/1998 |
| JP | 2005-151730 | 6/2005 |
| WO | WO 2004/040731 | 5/2004 |

OTHER PUBLICATIONS

Office Action in Japanese Patent Application No. JP2005-340147 mailed May 25, 2010.

* cited by examiner

*Primary Examiner*—Mark Connolly
*Assistant Examiner*—Paul B Yanchus, III
(74) *Attorney, Agent, or Firm*—Brundidge & Stanger, P.C.

(57) ABSTRACT

A power supply system is structured, which has a server disposed so that it is capable of communicating through redundant communication media with a user terminal at a user site which is capable of receiving power from one power supply system selected by making a switchover among a plurality of power supply systems; the server collects information about abnormalities caused in the plurality of power supply systems through other redundant communication media from abnormality detectors disposed in a plurality of power generating plants, each of which is part of one of the plurality of power supply systems, and on a plurality of electric transmission/distribution lines, each of which is also part of one of the plurality of power supply systems; the server determines whether the power supply system from which the user is currently receiving power is normal or abnormal; if the power supply system is abnormal, the server sends, to the user terminal, information about normal power supply systems from which the user is able to receive power.

18 Claims, 11 Drawing Sheets

POWER SUPPLY SYSTEM

CLAIM OF PRIORITY

The present application claims priority from Japanese application serial no. 2005-340147, filed on Nov. 25, 2005, the content of which is hereby incorporated by reference into this application.

BACKGROUND OF THE INVENTION

1. Field of the Invention

The present invention relates to a power supply system, and specifically to a power supply system that assures reliability in power supply even when an abnormality occurs in a power system from which power is being received.

The power system or power grid, here, includes the power supply supplied from the plant and the distributed power system i.e. micro power grid.

2. Description of the Prior Art

Participation to the power trading business has also become possible without restrictions. An increasing number of users are installing fuel cells and photovoltaic power generating facilities at their sites. An abnormality may occur due to a disaster in, for example, a power system from which a user usually receives power. When a plurality of power supplies are distributed as described above, if the user can switch the power system to another normal power system and receive power, the reliability of power supply to the user can be improved.

Japanese Patent Laid-open No. 2005-151730 proposes a propriety determination method by which an optimum energy source is selected in consideration of a running cost and environmental loads, such as Sox and Nox when a new energy source is installed. In this document, however, there is no description concerning countermeasures that should be taken when an abnormality occurs in a power system from which power is usually received.

SUMMARY OF THE INVENTION

Conventional practice when an abnormality occurs in a power system from which power is usually received is to entrust recovery from the abnormality to the power supplier. The only choice available to the user has been to wait until the power supply is restored. That is, even when a plurality of other normal power systems are present, the user cannot select another power system, preventing the reliability of power supply to the user from being improved.

In particular, if a large-scale disaster such as an earthquake occurs, it can be thought that power supply systems in a relatively wide area fail. It is also predicted that much time is taken for recovery. Some users want to receive power immediately from a normal power supply, if any, in this situation because their private power generation facilities alone are insufficient to supply necessary power.

In case of a large-scale disaster, in addition to assuring lifelines, related rescue organizations in the fire service, police, cutcherries, and the like demand to obtain life information immediately. However, no method of transmitting life information has been established.

An object of the present invention is to improve reliability in power supply to allow for an abnormality in a disaster or another emergency situation by enabling the user to select another normal power system for power reception when an abnormality occurs in a power system from which power is being currently received.

A power supply system structured in the present invention to solve the problem noted above has a server disposed so that it is capable of communicating through redundant communication media with a user terminal at a user site which is capable of receiving power from one power system selected by making a switchover among a plurality of power systems; the server collects information about abnormalities caused in the plurality of power systems through other redundant communication media from abnormality detectors disposed in a plurality of power generating plants, each of which is part of one of the plurality of power systems, and on a plurality of electric transmission/distribution lines, each of which is also one of the plurality of power systems; the server determines whether the power system from which the user is currently receiving power is normal or abnormal; if the power system is abnormal, the server sends, to the user terminal, information about normal power systems from which the user is able to receive power.

According to the inventive power supply system, this configuration enables the user terminal to receive server-provided information about normal power systems from which power can be received, so the user can select one normal power system from them and switch to it as the power system from which to receive power, and thus recover quickly, improving reliability in power supply to allow for an abnormality in a disaster or another emergency situation.

In this case, the server may determine whether the power system from which the user is currently receiving power is normal or abnormal, according to a request from the user terminal; if the power system is abnormal, the server may send, to the user terminal, information about normal power systems from which the user is able to receive power.

The plurality of power systems are structured so that they are mutually capable of sending and receiving power. A switching device is provided at the user site, by which one of a plurality of lead-in lines that are respectively connected to the plurality of power systems is selected so as to receive power. If the power system from which the user is currently receiving power is abnormal, the server may determine whether power can be supplied to one of the plurality of lead-in lines at the user site by combining one of the normal power systems, according to the abnormality information. In this case, the server may send, to the user terminal, information about a power supply capability by which power can be supplied to the user as a result of combining the normal power system.

Furthermore, the server may obtain a predicted recovery time taken to restore the power system according to the abnormality information and send the predicted recovery time to the user terminal. Accordingly, when the power system from which power is currently being received will be restored relatively quickly and the predicted recovery time will be thus short, the user can determine whether to select a normal power system and switch to it as the power system from which to receive power or to wait until the current power system is restored.

The above-mentioned predicted recovery time may be obtained from contents of a database provided in the server, the database storing a restart time of each of the power generating plants and a predicted recovery time that is preset for each type of abnormality. Alternatively, to obtain a predicted recovery time from contents of the database, the database may store a predicted recovery time preset for each type of abnormality on the electric transmission/distribution lines as well as the severity degrees of the electric transmission/distribution lines. The database may also store information used to reduce the predicted recovery time for a plurality of abnormalities related to the same electric transmission/distribution line. Specifically, when, on the electric transmission/distribution line, damages occur at a plurality of places or two or more types of damages occur, the recovery time can be reduced by rationalizing common recovery work for failures, thereby enabling calculation of a predicted recovery time to be rationalized.

An abnormality on the electric transmission/distribution line can be detected from at least one of information about the position of a detector distributed on the electric transmission/distribution line, information about a temperature near the electric transmission/distribution line, information about a change in phase of light in the interior of optical fiber provided near the electric transmission/distribution line, and information about a change in current or voltage, including a protective relay operation.

If the user does not make a notification of the power system selected by the user from the user terminal within a predetermined time, the server may determine that the user has an abnormality and send a message to the user terminal to check for safety; if there is also no response to the message, the server may notify a related rescuer organization. Accordingly, if a situation that requires lifesaving occurs, urgent information is automatically sent to a related rescuer organization, improving reliability related to human life at the occurrence of a disaster.

According to the present invention, if an abnormality occurs in a power supply system from which power is currently being received, the user can select another normal power supply system for power reception, improving reliability in power supply against a disaster or another emergency situation.

DESCRIPTION OF THE PREFERRED EMBODIMENTS

A power supply system of the present invention will be described below according to embodiments.

First Embodiment

Figure 1:
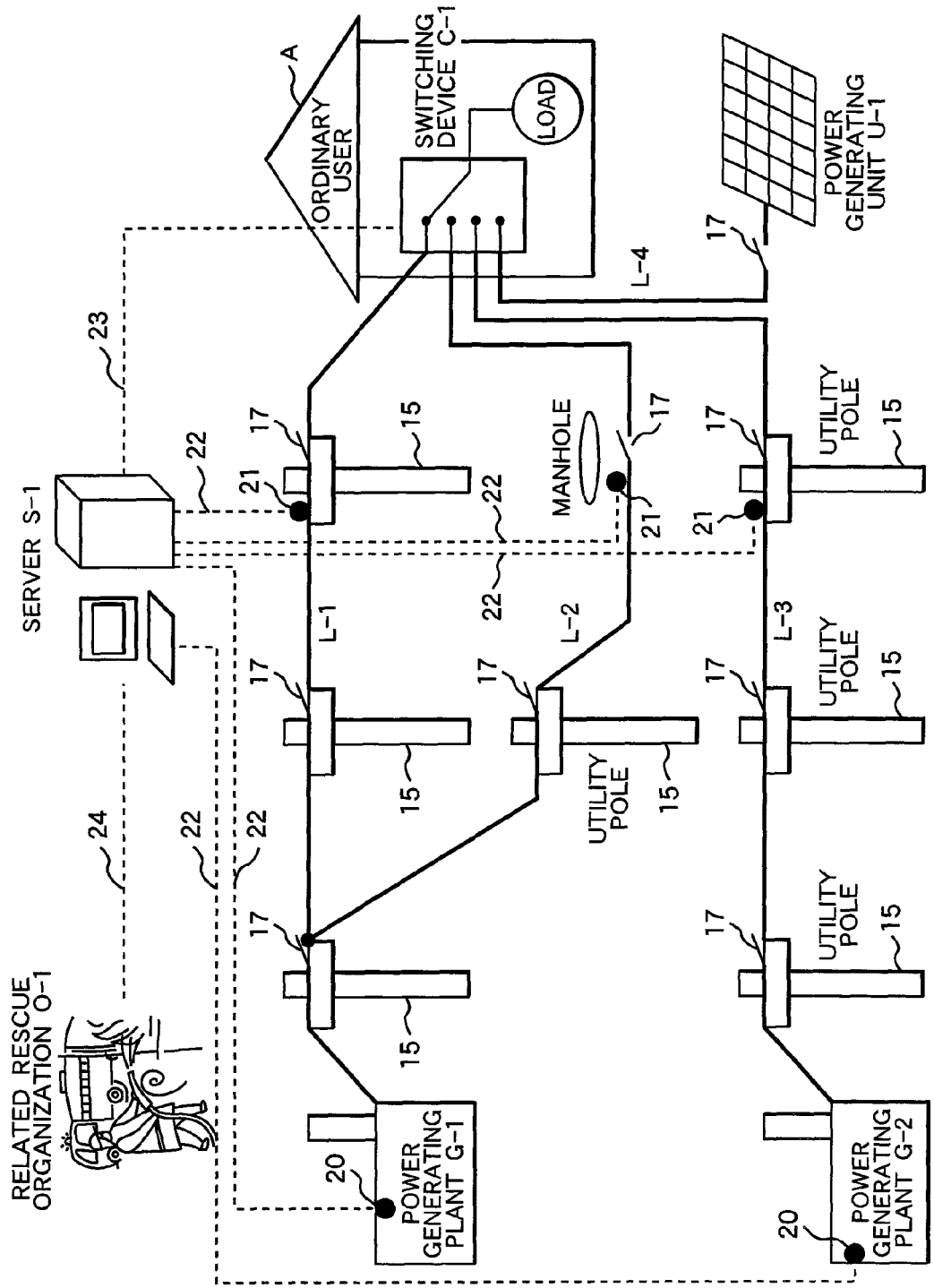
FIG. 1 shows the entire structure of a power supply system according to an embodiment of the present invention.

FIG. 1 shows the entire structure of a power supply system according to a first embodiment of the present invention. The power supply system in the first embodiment is intended for relatively small-scale ordinary users. The power supply system has a plurality of power generating plants (two power generating plants G-1 and G-2 in the figure). A power generating unit U-1 is a small-scale power generating facility, such as fuel cells, a photovoltaic power generating facility, or a wind power facility, provided at the site of a user A. The power generating plant G-1 is connected to a plurality of electric transmission/distribution lines (simply referred to below as lines); two lines L-1 and L-2 are connected in the figure. An electric transmission/distribution line includes an electric transmission line and an electric distribution line. The power generating plant G-2 is connected to a line L-3. The lines L-1 to L-3 are routed over utility poles 15 and manhole- and other power distribution means in such a way that power can be supplied to a plurality of users. For simplicity, only one user, A, is indicated in the drawing; in practice, however, a plurality of users are connected to the lines L-1 to L-3. The user A retrieves power from the lines L-1 to L-3 through lead-in lines. Power is also retrieved from the power generating unit U-1 through a line L-4. The user A selects one power system with a switching device C-1 to supply the power to a load.

The lines L-1 to L-4 are provided with switches 17 such as breakers or disconnect switches at appropriate places. Power generating plants G-1 and G-2 are each provided with an abnormality detector 20 that detects an abnormality therein. The lines L-1 to L-3 are each provided with abnormality detectors 21 that detect abnormalities thereon. Many abnormality detectors 21 are provided on each of the lines L-1 to L-3; to simplify the drawing, however, only one abnormality detector is indicated on each line.

The abnormality detectors 20 and 21 are communicably connected to the server S-1 through redundant communication media 22. The server S-1 is also communicably connected through a redundant communication media 24 to related rescue organizations O-1 in a fire station, a police office, a cutchery, and the like. The redundant communication media are multiplexed to assure reliable communication; both wireless communication media and wired communication media are applicable as the redundant media.

Figure 2:
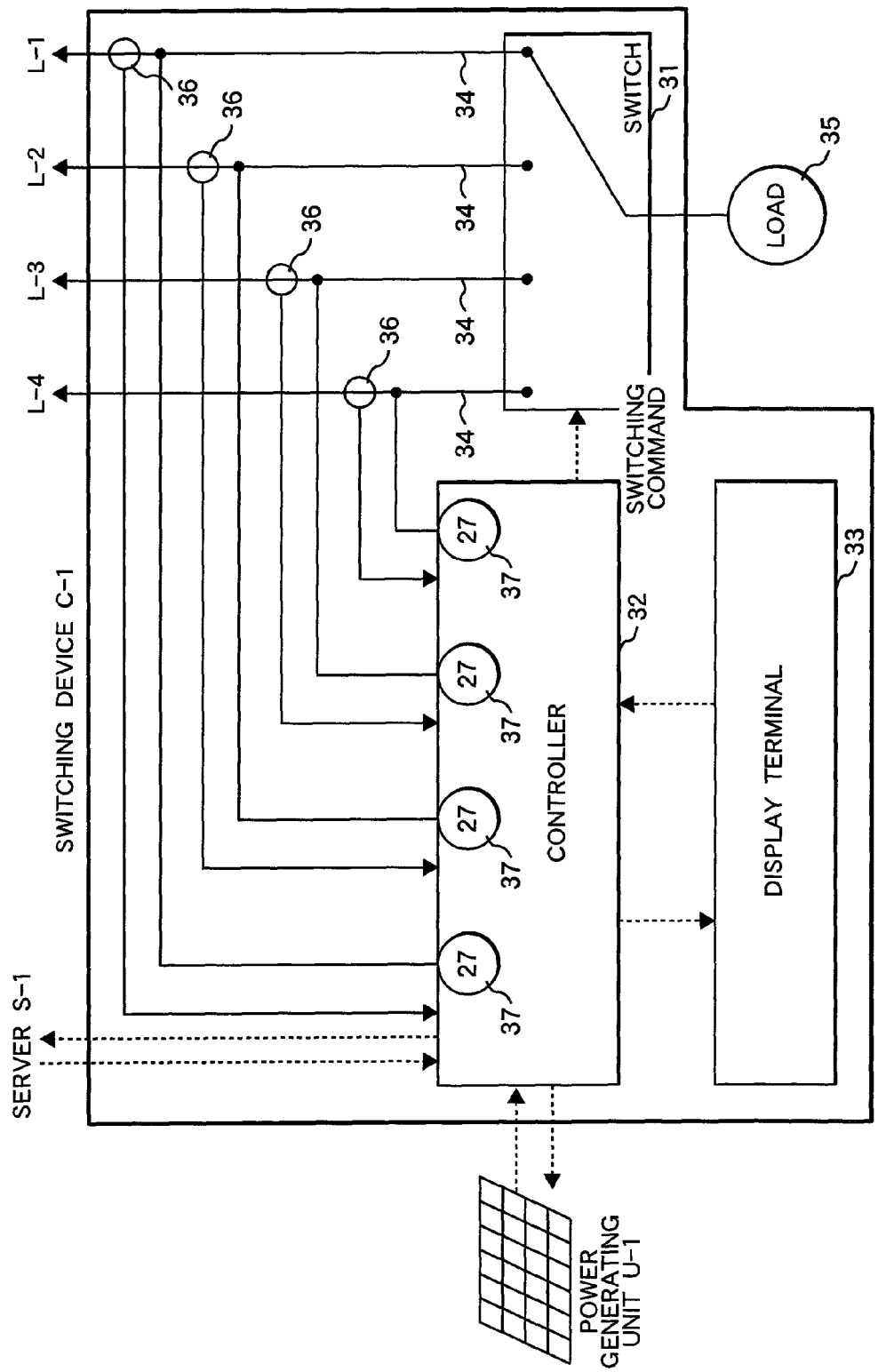
FIG. 2 shows the structure of a switching device that constitutes a user terminal according to an embodiment.

FIG. 2 shows the structure of the switching device C-1 in detail. The switching device C-1 comprises a switch 31, a controller 32, and a display terminal 33. The controller 32 and the display terminal 33 constitute the user terminal in the power supply system according to this embodiment. The switch 31 is structured so that it selects one of the lead-in lines 34 connected to the lines L-1 to L-4 and connect the selected lead-in line to the load 35. The controller 32 controls the switch 31; it retrieves current information from current transformers 36 respectively provided on the lead-in lines 34, and detects voltages of the lead-in lines 34 by use of under-voltage relays 37. The controller 32 also has a built-in battery, so it is operable even during a power outage. The display terminal 33 sends and receives information to and from the controller 32; it has a display screen, on which information is displayed, and a sound generator such as a speaker. The controller 32 also controls the power generating unit U-1. The controller 32, which is included in the user terminal, is communicably connected to the server S-1 through redundant communication media 23.

The structure of the power supply system as described above will be described in detail together with its operations.

As basic functions, the server S-1 uses information obtained from the abnormality detectors 20 in power generating plant G-1 or G-2 and the abnormality detectors 21 on the line L-1, L-2, or L-3 to obtain the state (normal or abnormal) of the power generating plant G-1 or G-2, a power generation capacity, if the state is normal, and a predicted recovery time, if the state is abnormal, as well as the state (normal or abnormal) of the line L-1, L-2, or L-3, a transmission capacity, if the state is normal, and a predicted recovery time, if the state is abnormal. These information items are sent to the controller 32 in the user terminal and then displayed on the display terminal 33. The description that follows is based on the flowcharts shown in FIG. 3 to 7.

[Processing I by the Server S-1]

Figure 3:
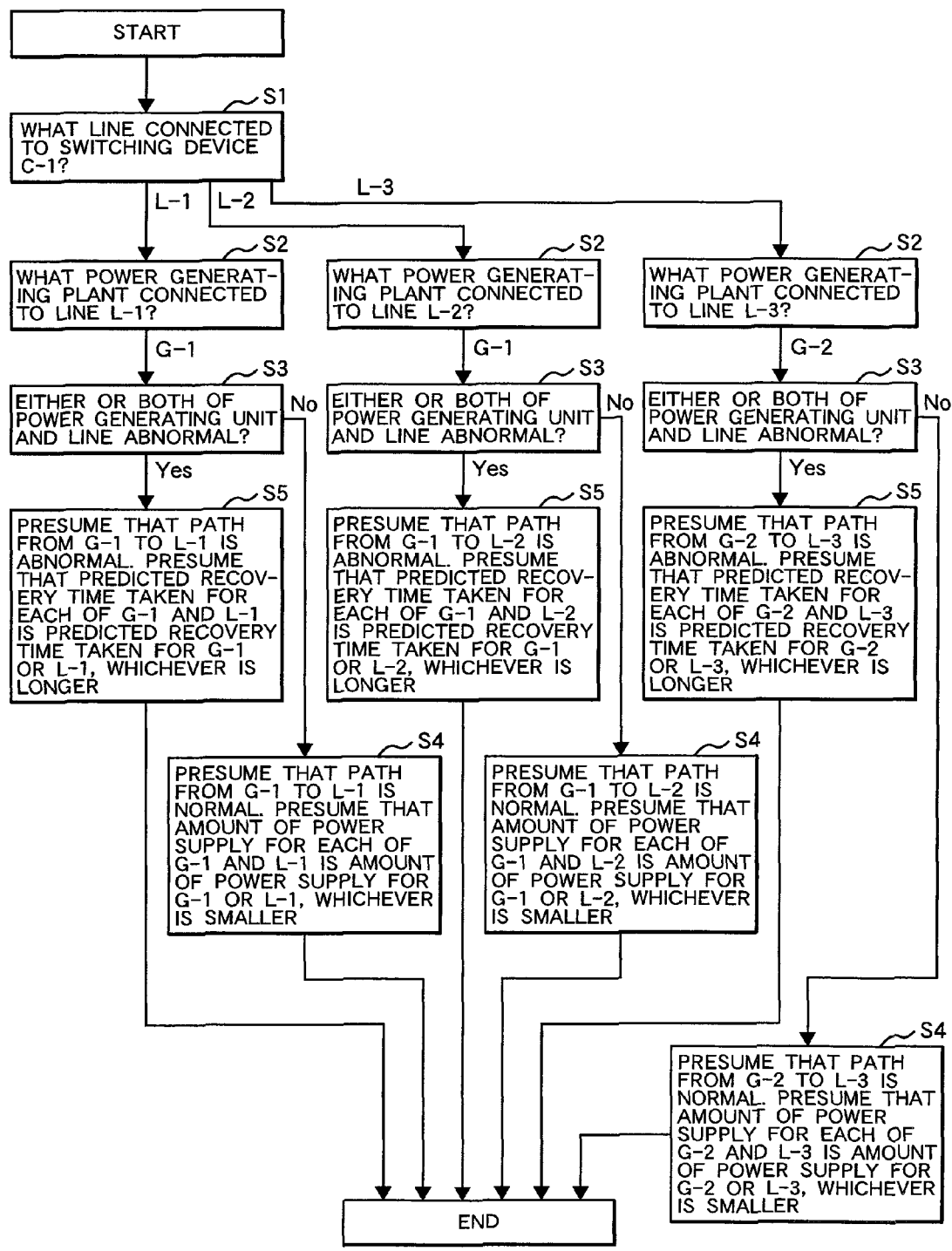
FIG. 3 is a flowchart that indicates processing I by a server according to an embodiment.

The server S-1 periodically executes the processing shown in FIG. 3. First, the server S-1 decides the lines connected to the switching device C-1 at the user A in step S1. This decision is made according to information about connections of the power systems; the information is sent from the controller 32 in the switching device C-1 and stored in memory or the like separately. In this embodiment, three lines, L-1 to L-3, are connected to the switching device C-1, so processing in steps S2 to S5 is executed for the lines L-1 to L-3 and then terminated.

In step S2, a database in which the system configuration of the power systems is stored is searched to retrieve information on the power generating plant G-1 connected to the lines L-1 and L-2 and the power generating plant G-3 connected to the line L-3. Next, in step S3, abnormality information from the abnormality detectors 20 and 21 is checked to determine whether the power generating plants G-1 and G-2 and the lines L-1 to L-3 are normal or abnormal. If all of them are normal, the sequence proceeds to step S4, in which the minimum of the power supply capacities of the power generating plants G-1 and G-2 and the lines L-1 to L-3 is assumed to be a power supply capability, terminating the processing.

If any of the power generating plants G-1 and G-2 and lines L-1 to L-3 is determined to be abnormal in step S3, the sequence proceeds to step S5, in which a recovery time taken for the abnormal power system is assumed to be the recovery time taken for the power generating plant or the recovery time taken for the line, whichever is larger. When the processing in FIG. 3 is executed, information indicating whether, out of the plurality of power systems connected to the user A, there is a normal power system from which the user can receive power, a power supply capability, and other information are obtained. Specifically, it can be determined whether the power system from which the user A is currently receiving power is normal or abnormal; if the power system is abnormal, information about normal power systems from which the user A can receive power is sent to the switching device C-1 at the user site.

Assuming that an abnormality has occurred in a power system in FIG. 1 due to a regional disaster such as an earthquake, a specific example will be given. Assume the following situation:

G-1: Normal; the power generating capacity is 70 kVA.
G-2: Abnormal; the predicted recovery time is 1 hour.
L-1: Abnormal; the predicted recovery time is 2 hours.
L-2: Normal; the transmission capacity is 80 kVA.
L-3: Normal; the transmission capacity is 50 kVA.

Then, the server S-1 determines the capacity of power supply to the user A as follows:

System from G-1 to L-1: Abnormal; the predicted recovery time is 2 hours.
System from G-1 to L-2: Normal; the power supply capacity is 70 kVA.
System from G-2 to L-3: Abnormal; the predicted recovery time is 1 hour.

If the user A is currently receiving power from the system from G-1 to L-2, this result indicates that the system is normal. If the user A is currently receiving power from the system from G-1 to L-1, it is predicted that two hours are taken for recovery. If the user A wants immediate recovery, the power receiving system needs to be switched to the system from G-1 to L-2.

[Processing II by the Server S-1]

Figure 4:
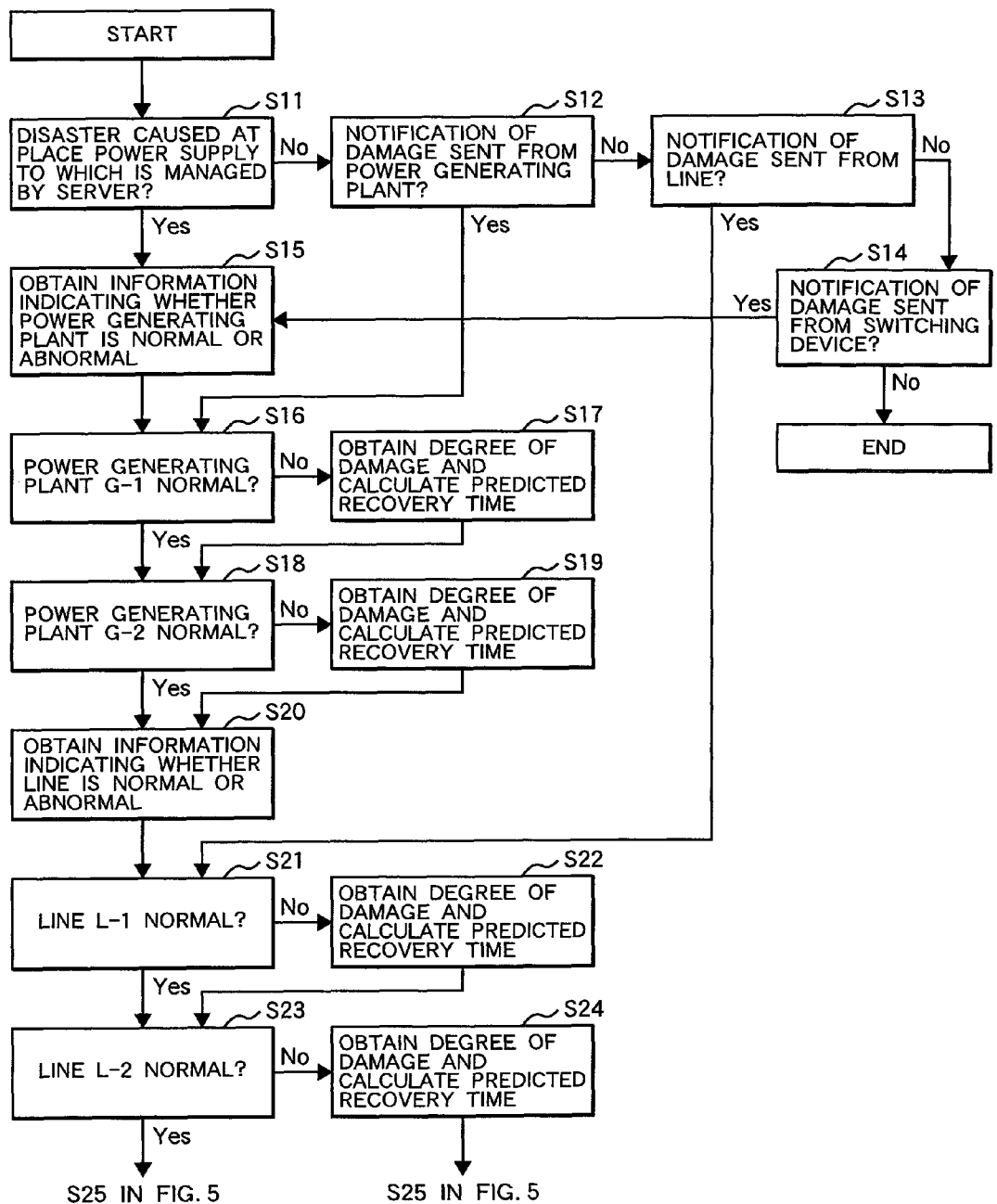
FIG. 4 is a flowchart that indicates processing II by a server according to an embodiment.
Figure 5:
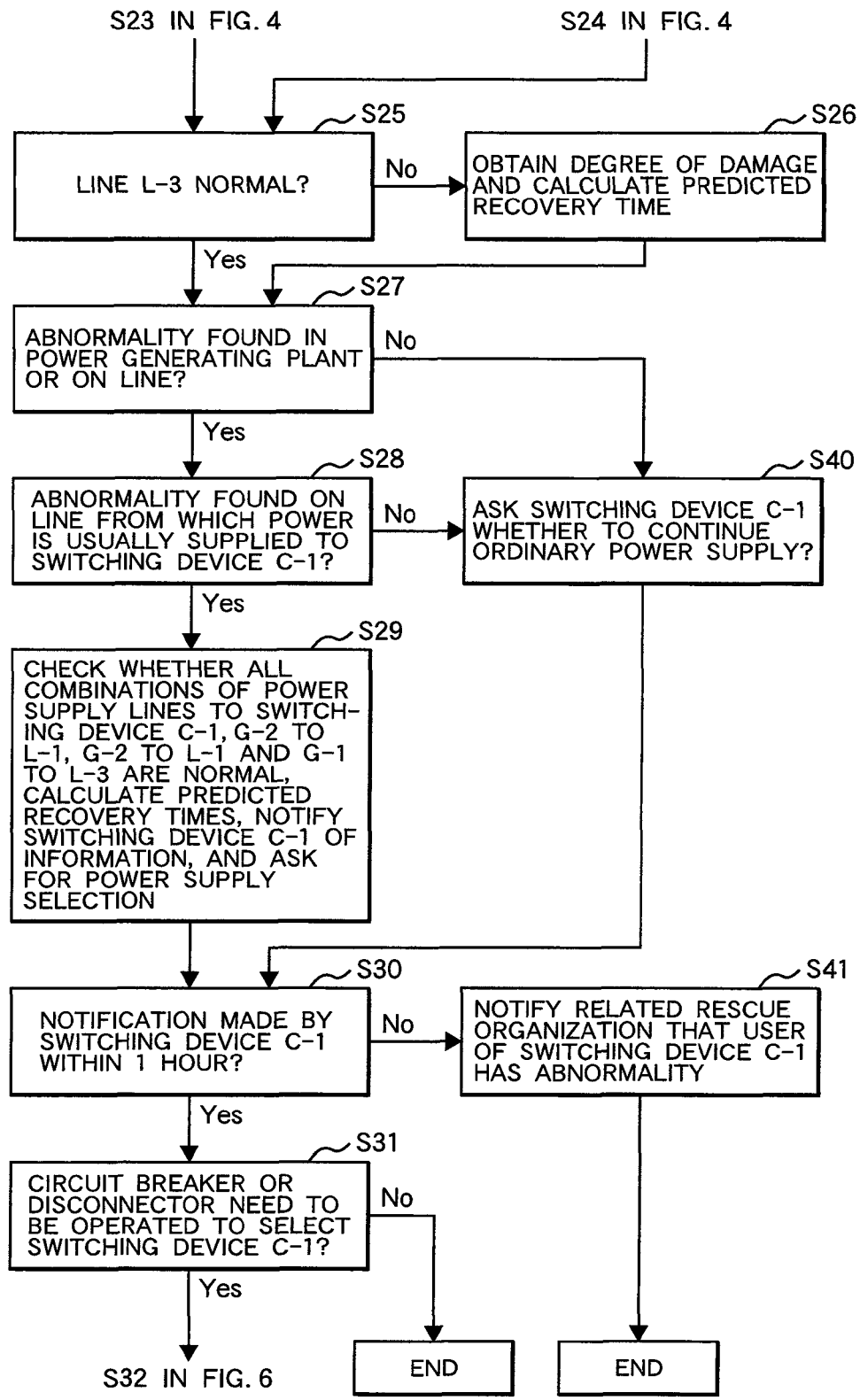
FIG. 5 is also a flowchart that also indicates processing II by a server according to an embodiment.
Figure 6:
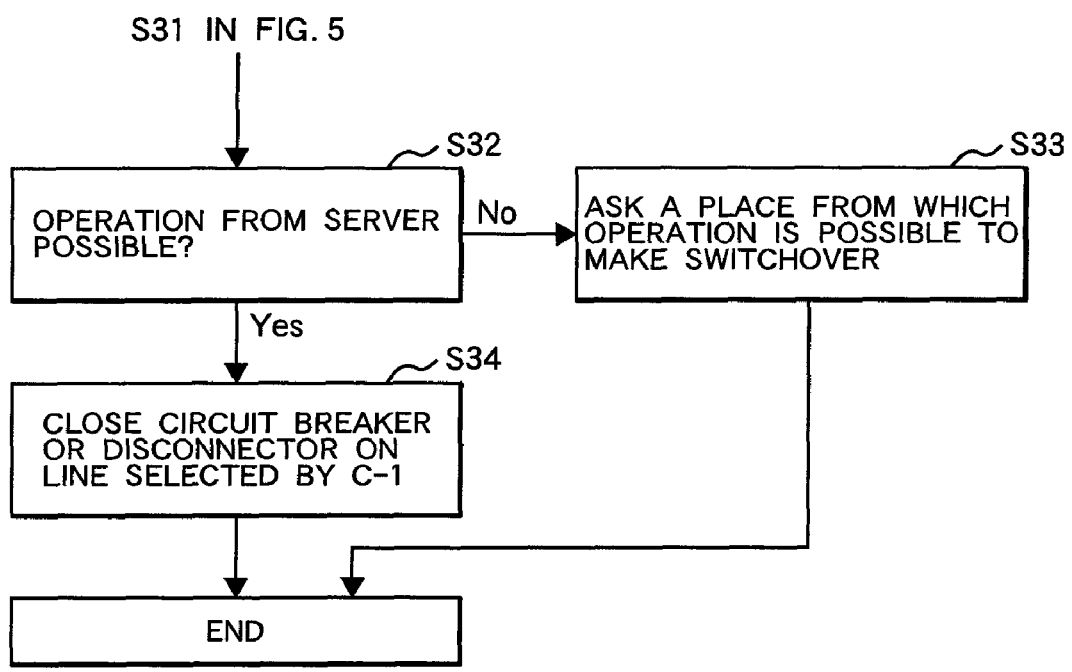
FIG. 6 is also a flowchart that also indicates processing II by a server according to an embodiment.

FIGS. 4 to 6 show processing performed by server S-1 when the power system to the user needs to be switched. The server S-1 executes the processing in FIGS. 4 to 6 to obtain power supply information related to the power systems.

The server S-1 receives information about the occurrences of a disaster and the like from a plurality of routes (S11 to S14); that is, (1) receives disaster information indirectly at a power management place, managed by the server S-1, within the range of the power system, (2) receives abnormality information from the abnormality detectors 20 in the power generating plants and the abnormality detectors 21 on the lines, and (3) notified of power system abnormality information by the switching device C-1.

When receiving abnormality information, the server S-1 executes processing in step S15 and later. First, the server S-1 checks for abnormality in the power generating plants in steps S16 to S19 and then checks for abnormality on the lines in steps S20 to S26. In steps S27 and S28, the server S-1 checks whether power is supplied normally to the switching device C-1 disposed at the site of the user A. If power supply to the switching device C-1 is abnormal, the server S-1 analyzes the power supply information obtained for each power system in accordance to the flowchart in FIG. 3 in step S29, and asks the switching device C-1 to select a power system. Specifically, the server S-1 sends power supply information to the switching device C-1 so as to be displayed on the display terminal, indicating information about alternate power systems to the user and asking the user to select an alternate power system.

After asking the switching device C-1 to select an alternate power system, if the switching device C-1 responds within a predetermined time (for example, one hour) (S30), the server S-1 checks whether the switch 17 (breaker or disconnect switch) needs to be operated to switch to an alternate system according to a selection command from the switching device C-1 (S31). If the switch 17 needs to be operated, the server S-1 checks whether its operation is possible from the server S-1. If it is possible, the server S-1 closes the switch 17 (S34). If it is not possible, the server S-1 asks a predetermined place from which its operation is possible to operate the switch 17 (S33). This completes the power system switching operation at the occurrence of an abnormality.

Now, processing in steps S16 to S24 in FIG. 4 will be described in detail. If no abnormality information concerning the power generating plant G-1 or G-2 is sent from the abnormality detector 20, the server S-1 determines that the power generating plant is operating normally. The power generation capacities during the normal operation of the power generating plants G-1 and G-2 are stored in the database in the server S-1 in advance. When the power generating plant G-1 or G-2 is operating normally, the server S-1 estimates the power generation capacity by using information in the database.

If the server S-1 determines that the power generating plant is abnormal, the server S-1 predicts a time taken to recover the power generating plant. The predicted recovery time for the power generating plant is determined by checking an accident type obtained from the abnormality detector 20 in the power generating plant against the predicted recovery time table (Table 1) that lists types of power generating plant accidents and is stored in advance in the database in the server S-1.

TABLE 1

Predicted recovery times to restore the power generating plant

| Type of accident | | Predicted recovery time |
|---|---|---|
| Accident outside the power generating plant | | 1 hour |
| Accident inside the power generating plant | Failure of a main part in the power generating plant | 10 hours |
| | Failure of another part | 5 hours |
| | Abnormal device output | 2 hours |

If the server S-1 then determines that the line L-1, L-2, or L-3 is abnormal, the server S-1 predicts a time taken to recover the line, as described below. Abnormality information is input from the abnormality detector 21 disposed on the line L-1, L-2, or L-3 to the server S-1. The abnormality information concerning the line includes the abnormalities and positions of the switches 17 disposed on the line as well as the places and details of abnormalities such as line destruction. Predicted recovery times are stored in tables (Tables 2 and 3) in the database in the server S-1 in advance, in correspondence to these line abnormality information items.

TABLE 2

Predicted recovery times to recover from line accidents

| Place | Type of accident | Predicted recovery time |
|---|---|---|
| Above ground in an urban area | Open disconnect switch or breaker | 1 hour |
| | Broken line | 10 hours |
| | Too high temperature | 5 hours |
| Under ground in an urban area | Open disconnect switch or breaker | 1 hour |
| | Broken line | 48 hours |
| | Too high temperature | 24 hours |
| Pylon in a suburb | Open disconnect switch or breaker | 2 hours |
| | Broken line | 96 hours |
| | Too high temperature | 48 hours |

TABLE 3

Compensation of predicted recovery times to recover from a plurality of line accidents

| Cause 1 | Cause 2 | Cause 3 | Compensated time |
|---|---|---|---|
| Open disconnect switch or breaker | Broken line | Too high temperature | Minus 6 hours |
| Open disconnect switch or breaker | Broken line | — | Minus 1 hour |
| Open disconnect switch or breaker | Too high temperature | — | Minus 1 hour |
| Too high temperature | Broken line | — | Minus 5 hours |

The server S-1 checks received abnormality information against Table 2 or 3, and determines a predicted recovery time to restore a line by adding a time to repair the line, a delay caused by a priority level in the wire repair, a time to repair each switch, and a time for a repair person to travel to a place where to repair, as follows:

Predicted recovery time to restore a line=recovery time to repair the line+time to repair a switch× failure information+time for repair person to travel+predicted time to repair prioritized transmission line When a recovery time taken at the occurrence of a line failure is calculated, the predicted recovery time corresponding to each transmission or distribution line accident in Table 2 is checked. If there are a plurality of failures, the recovery work time is reduced due to recovery work common to individual failures, so the data in Table 3 is also checked to compensate the recovery work time. A predicted recovery time for the transmission lines is then determined by totaling a recovery time corresponding to an accident detected on each transmission line. Specifically, when, on the same line, damages occur at a plurality of places or two or more types of damages occur, the recovery time can be reduced by rationalizing common recovery work for failures, thereby enabling determination of a predicted recovery time to be rationalized.

[Processing by the Switching Device C-1]

Figure 7:
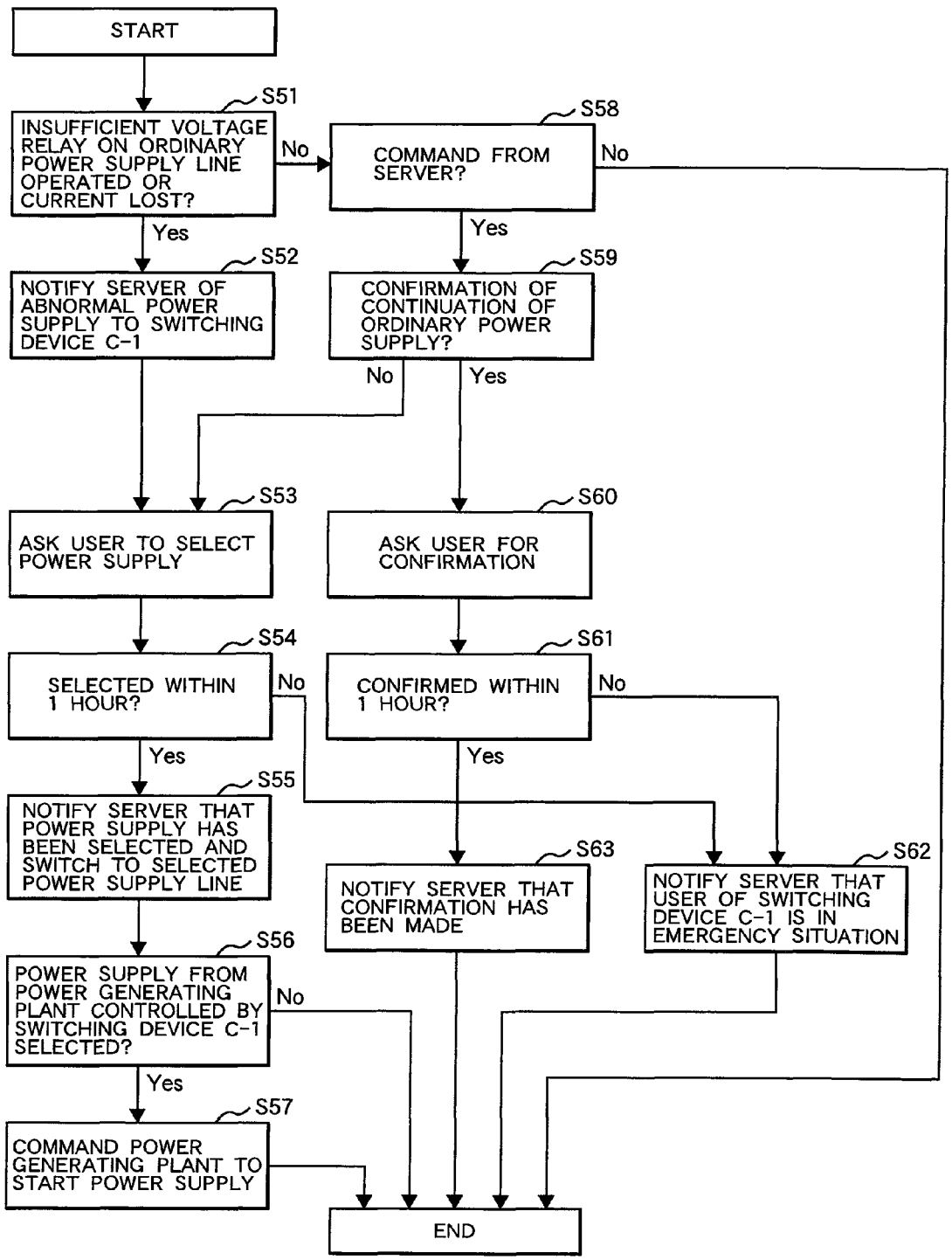
FIG. 7 is a flowchart that indicates processing by a switching device C-1 according to an embodiment.

Now, processing in the controller 32 by the switching device C-1, which is a user terminal, will be described with reference to FIG. 7. Specifically, described is a process from when an ordinary power system at the site of the user A becomes abnormal due to a disaster to when the user A selects a switching setting. The switching device C-1 periodically executes the processing in FIG. 7. In step S51, the switching device C-1 determines whether there is an abnormality on the power system according to a current detected by the under-voltage relay 37 or the current transformer 36. If there is an abnormality, the switching device C-1 notifies the server S-1 in step S52. If the determination in step S51 is that there is no abnormality, the switching device C-1 determines whether there is a command from the server S-1 (S58). If there is no command from the server S-1, the switching device C-1 terminates the processing. If a command from the server S-1 is other than to confirm continuation of power supply from the ordinary power system (S59), the sequence proceeds to step S53 and the switching device C-1 displays a request asking the user to select a power system on the display terminal 33. If a selection is made within a predetermined time (for example, one hour) (S54), the sequence proceeds to step S55, in which the switching device C-1 notifies the server S-1 of the selected power system and sets the switch 31 to the selected power system. When power supply from the power generating unit U-1, which is controlled by the switching device C-1, is selected, the switching device C-1 commands the power generating unit U-1 to start power supply (S57) and then terminates the processing.

If the decision in step S59 is such that the command from the server S-1 is to confirm continuation of power supply from the ordinary power system, the switching device C-1 notifies the display terminal 33 so as to obtain a confirmation of continuation of power supply from the ordinary power system (S60). If this confirmation is made within a predetermined time (for example, one hour) (S61), the sequence proceeds to step S63 and the switching device C-1 notifies the server S-1 and then terminates the processing.

If the user does select an alternate power system or does not respond to the confirmation as to whether to continue power supply from the ordinary power system within a predetermined time (for example, one hour) in step S54 or S61, the switching device C-1 notifies the server S-1 that the user of the switching device C-1 is placed in an emergency situation in which he or she cannot respond (step S62). That is, if the user A does not operate the switching device C-1 within a predetermined time in response to the request, which is sent from the server S-1 to the switching device C-1, for a power system switchover, it is thought that the user A cannot respond for some reason. For example, the user A may be decided to be in a situation that requires lifesaving. The server S-1 then notifies a related rescue organization O-1 that the user A has a problem. That is, when the user is placed in a lifesaving requiring situation, the user terminal can notify, through the server, a public organization of information about lifesaving, depending on the degree of a disaster.

When the server S-1 indirectly obtains information indicating that the user A falls to a victim to a disaster, whether the user A is safe can be checked through the switching device C-1. If it can be decided from a result of the check that the user A is placed in a lifesaving requiring situation, the server S-1 can notify the related rescue organization O-1.

A specific example for a power system switchover will now be described. Assume that the user A usually receives power from the power generating plant G-1 through the line L-1. The states of the power generating plant and line are, for example, as follows:

G-1: Normal; the power generating capacity is 70 kVA.
G-2: Abnormal; the predicted recovery time is 1 hour.
L-1: Abnormal; the predicted recovery time is 2 hours.
L-2: Normal; the transmission capacity is 80 kVA.
L-3: Normal; the transmission capacity is 50 kVA.
U-1: Normal, the power supply capacity is 10 kVA.

The server S-1 confirms that the power system from which the user A has been receiving power has become abnormal, and then notifies the switching device C-1 of the following information about power supply to the user A. The switching device C-1 also obtains the power supply information from the power generating unit U-1.

System from G-1 to L-1: Abnormal; the predicted recovery time is 2 hours.
System from G-1 to L-2: Normal; the power supply capacity is 70 kVA.
System from G-2 to L-3: Abnormal; the predicted recovery time is 1 hour.

The switching device C-1 displays the power supply information received from the server S-1 on the display terminal 33 and requests the user A to select a power system switchover setting. The request is made by providing a display on the display screen and by generating a sound (including a voice and beep) through a speaker installed in the switching device C-1. In response to the request, the user A operates the switching device C-1 to select a power system. If the system from G-1 to L-2 is selected in the above example, the controller 32 in the switching device C-1 changes the switch 31 to power reception from L-2. The switching device C-1 notifies the server S-1 that the user A requests power reception from the power system from G-1 to L-2. In response to this, the server S-1 closes switches 17 such as breakers or disconnect switches on the power system from G-1 to L-2 so that power is supplied from the power system to the user A. If the server S-1 cannot operate these switches 17, the server S-1 sends a command to an organization that can operate them. When the selected power system is from the power generating unit U-1, the switching device C-1 commands the power generating unit U-1 to generate power.

According to this embodiment, as described above, the switching device C-1, which is the user terminal, receives information, which is provided by the server S-1, about normal power systems from which power can be received, so the user can select one normal power system from them and switch to it as the power system from which to receive power, resulting in a quick recovery. This improves reliability in power supply to allow for an abnormality in a disaster or another emergency situation.

That is, in addition to conventional power transmission by an electric power company, distributed power supplies are widely used by general users, which enables a user to select one power system from a plurality of power generating plants and a plurality of transmission lines to receive power. In such a society, if power supply selected by the user at normal time is suspended due to, for example, a disaster, the user can receive information about power supply from the server and operate the terminal so as to receive power as required by the user. Accordingly, the reliability of power supply at the occurrence of a disaster can be improved.

The server S-1 determines whether the power system from which the user is currently receiving power is normal or abnormal, according to a request from the switching device C-1. If the power system is abnormal, the server S-1 notifies the user of information about normal power systems from which the user can receive power, so the user can immediately determine an action to be taken against the abnormality.

Furthermore, the server S-1 obtains a predicted recovery time taken to restore the abnormal power system and notifies the user of it, so when the power system from which power is currently being received will be restored relatively quickly and the predicted recovery time will be thus short, the user can determine whether to select a normal power system and switch to it as the power system from which to receive power or to wait until the current power system is restored.

Second Embodiment

The examples in the first embodiment described above have been applied to power supply systems intended for relatively small-scale ordinary users. However, the present invention is not limited to them; it should be understood that the present invention can also be applied to power supply systems intended for so-called large-scale users.

Figure 8:
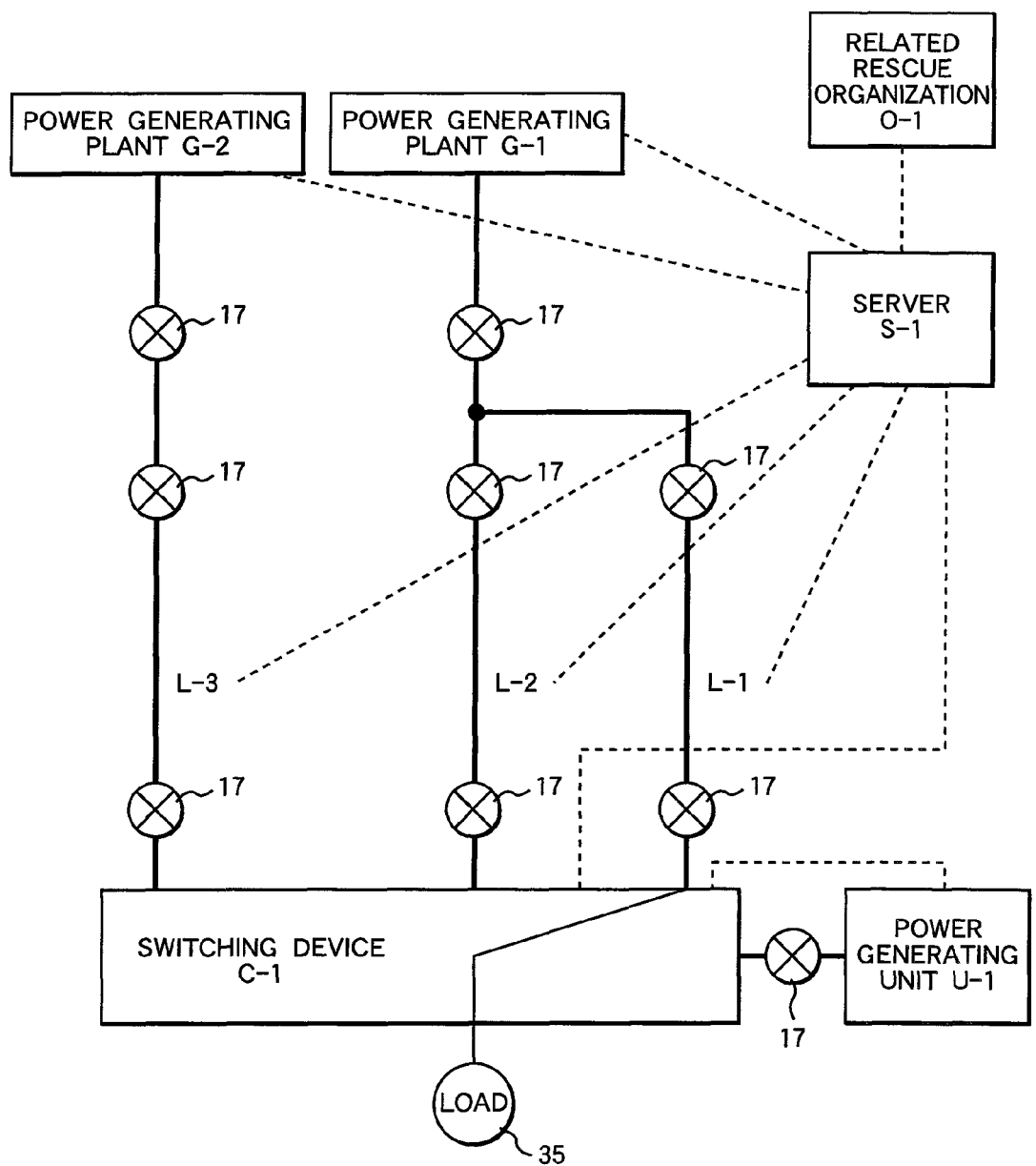
FIG. 8 shows the entire structure of a power supply system according to another embodiment of the present invention.

FIG. 8 shows the configuration of the systems of a power supply system intended for large-scale users. The second embodiment is essentially the same as the first embodiment in FIG. 1 except that the voltage levels on the power systems are high and the amount of power is large, so a description of the second embodiment will be omitted by assigning the same reference numerals to the same components as in the first embodiment.

Third Embodiment

Next, specific examples for the abnormality detector 21 on the line L-1 to L-3 which are applied to the power supply systems in the above first and second embodiments and for the methods of calculating predicted recovery times will be described.

First Example

Figure 9:
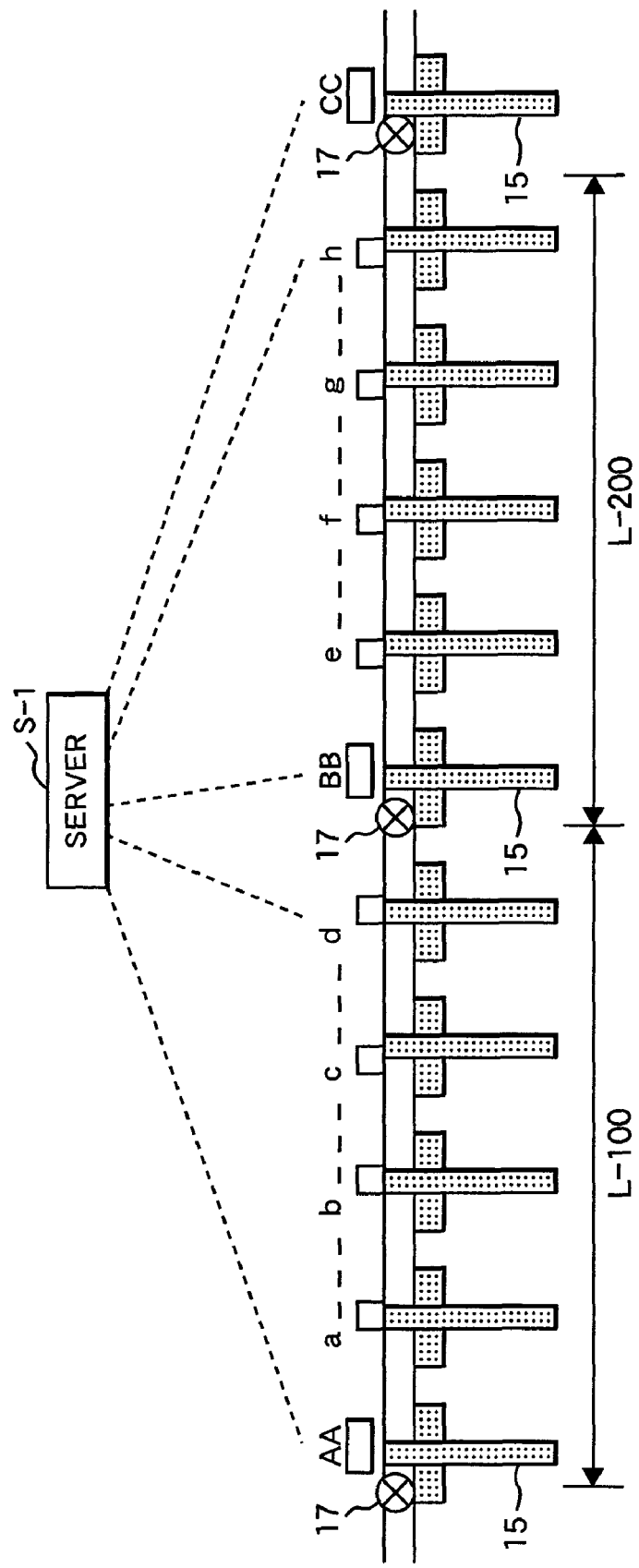
FIG. 9 illustrates exemplary abnormality detectors on a line L.

The information from the abnormality detectors 21 on the line L-1 to L-3 and the methods of calculating predicted recovery times, which are obtained by the server S-1, will be described by using the configuration of a line L shown in FIG. 9 as an example. As shown in FIG. 9, the line L is laid over a plurality of utility poles 15 and segmented at appropriate points by the switches 17 such as breakers or disconnect switches. Each switch 17 is provided with a failure detector AA, BB, or CC. Each utility pole 15 is provided with a failure detector a, b, c, d, e, f, g, or h. When the line L is laid in a culvert or the like, the failure detectors a to h are disposed in manholes or other places where maintenance is possible. The failure detectors AA to CC and a to h are structured so that they can communicate with the server S-1 through the redundant wired or wireless communication media 22. Calculation of a predicted recovery time for the line L is performed for individual segments, such as L-100 and L-200, divided by switches 17.

The failure detectors a to h each generate a signal indicating a normal state at a normal time. When a failure occurs, these detectors generate a signal that indicates its type. The signal indicating a normal or abnormal state is sent to an adjacent failure detector through communication. The adjacent failure detector adds the normal or abnormal state signal received from the preceding failure detector to a normal or abnormal state signal detected by the adjacent failure detector, and then sends the resulting signal to another failure detector different from the preceding failure detector from which the adjacent failure detector received the signal. Thus, an integrated signal indicating a normal or abnormal state is finally sent to the server S-1. The failure detectors AA to CC disposed in the switches 17 each send the server S-1 a signal indicating a normal state at normal time and a signal indicating a failure type when a failure occurs.

The server S-1 checks the integrated normal or abnormal state signal obtained from the failure detectors connected to the server S-1, out of the failure detectors a to h, and the normal or abnormal state signals obtained from the failure detectors AA to CC against the data in Tables 2 and 3 stored in the database in the server S-1, and calculates a predicted recovery time for each line according to the expression described above.

If there are a plurality of failures, the recovery work time is reduced due to recovery work common to individual failures, so the data in Table 3 is also checked to compensate the recovery work time. A predicted recovery time for the transmission lines is then calculated by totaling a recovery time corresponding to an accident detected on each transmission line. How calculation is performed will be described below, assuming that failure detectors detect failures, described blow, on lines laid, for example, above the ground in an urban area.

Failure detectors a to d are provided; the server S-1 receives normal state information from the detector a and abnormal state information indicating a broken line, a too high temperature, and an open disconnect switch from the detectors b, c, and d, respectively. Since the line is laid above the ground in an urban area, the predicted recovery time on the ground in an urban area in Table 2 is checked. Accordingly, a predicted recovery time of 16 hours is obtained by simply adding 0 hour (normal) for the failure detector a, 10 hours for the failure detector b, 5 hours for the failure detector c, and 1 hour for the failure detector d. In this case, there are a plurality of failure factors, so 6 hours is reduced according to the compensation table (Table 3). As a result, the predicted recovery time for the line is estimated at 10 hours (16 hours minus 6 hours).

Another example will be described with the following settings.

Line repair times: L-100; 1 hour, L-200; 2 hours
Switch repair times: AA; 5 hours, BB; 5 hours, CC; 5 hours
Wire repair priorities: L-100; second, L-200; first
Time taken for a repair person to travel: L-100; 2 hours, L-200; 3 hours
States of the failure detectors in switches: AA; failed, BB; normal, CC; normal Under these settings, a predicted recovery time for the L-100 will be calculated. The server S-1 first calculates the predicted recovery time for the line L-200 which has a higher priority. The predicted recovery time for the line L-200 is estimated at 5 hours by adding the line repair time for the L-200 (2 hours) and the time taken for a repair person to travel to the L-200 (3 hours).

The predicted recovery time for the L-100 is estimated at 13 hours by adding the line repair time (1 hour) for the L-100, the switch repair time at AA (5 hours) multiplied by 1 (number of abnormalities), the time taken for a repair person to travel to the L-100 (2 hours), and the predicted recovery time for L-200 (5 hours).

Second Example

The failure detectors a to h in FIG. 9 detect an abnormality on the line L from any one of information items about the position of a detector, a change in current or voltage, including a protective relay operation, information about a temperature near the line, abnormality detection by use of optical fiber, and the like, or from a combination of them.

In a method of detecting an abnormality in the line L from positional information about detectors, for example, when the line is laid over utility poles or under the ground, each failure detector disposed in a manhole or another place where maintenance is possible obtains its latitude and longitude by use of the global positioning system (GPS) or another means. If there is a change from the ordinary position, the failure detector obtains the latitude and longitude of an adjacent detector from it, and calculates the distance to the adjacent detector. If the calculated distance is larger than a length registered in advance for the laid line by a predetermined amount or more, it is determined that the line is broken.

Figure 10:
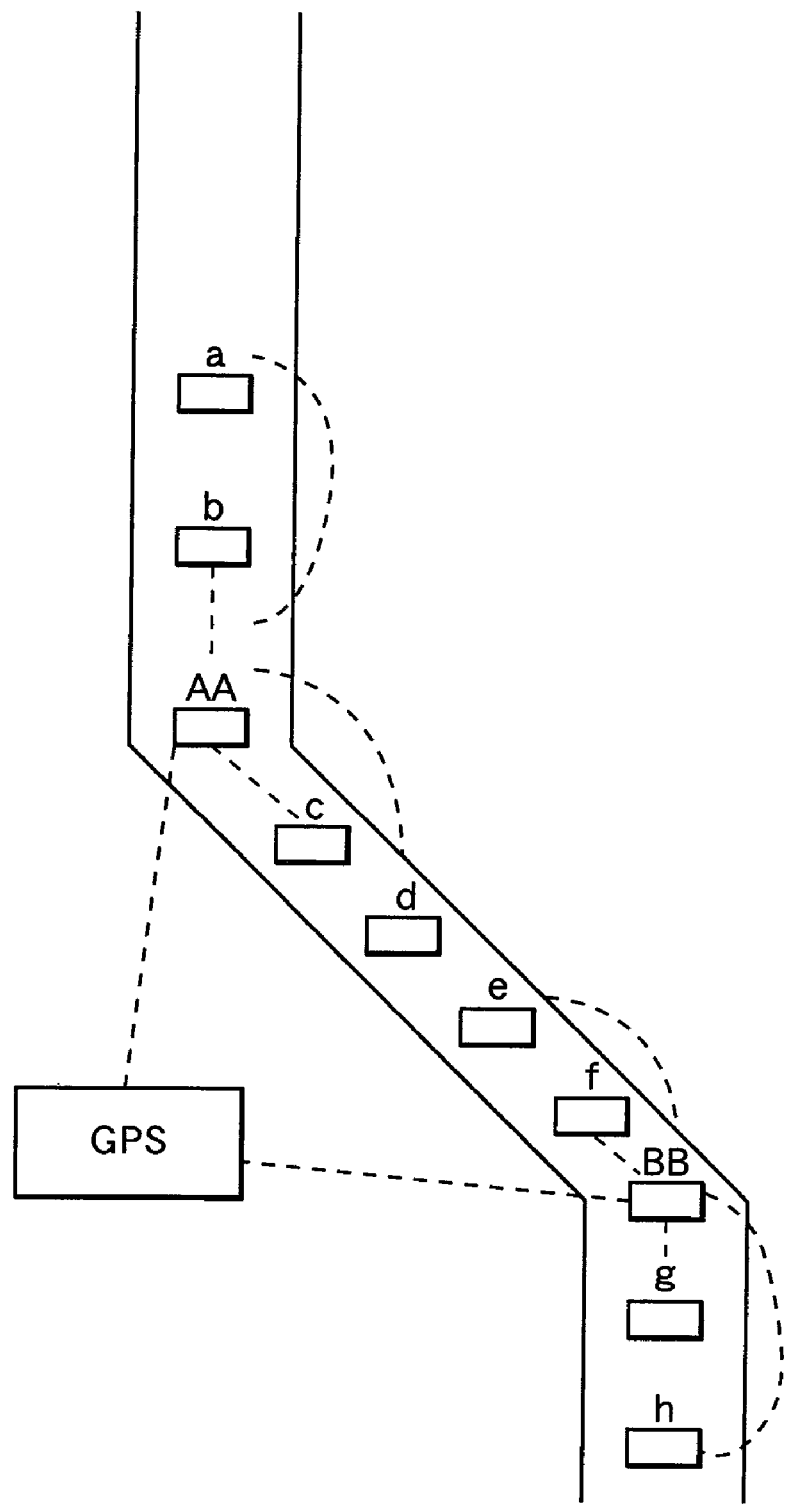
FIG. 10 illustrates an example of detecting a line abnormality by use of positional information in failure detectors disposed on the line.

As shown in FIG. 10, failure detectors AA and BB, which are used as positional reference points, are set in places, on utility poles or in a culvert, over which or in which the line L is laid, where access to the ground is possible by maintenance, communication is possible from the GPS, and the line L is laid straightly up to the next reference point. The failure detectors a to h are also disposed in places, in the culvert through which the line L is passed, where access to the ground is possible by maintenance. The failure detectors AA and BB detect their latitudes and longitudes by use of the GPS or another means. The failure detectors a to h detect the strengths of radio signals generated from the failure detectors AA and BB. When the failure detector AA or BB moves, if the strength of the radio signal from the failure detector is smaller than a strength registered in advance by a predetermined amount or more, the failure detectors a to h determine that the line is broken.

Third Example

Each of the failure detectors a to h in FIG. 9 can detect a line abnormality on the basis of information about the temperature measured near the line by the failure detector. Specifically, the failure detectors a to h each have a temperature sensor near the line. A graph that plots current against temperature is preset in each failure detector. When current and temperature measurements deviate, a line abnormality is determined to have occurred.

The occurrence of an abnormality on the line is also determined by disposing many temperature sensors near the line; a temperature distribution of the line is formed according to temperatures sensed by the temperature sensors; if there is a local temperature gradient, the line is determined to have an abnormality.

Fourth Example

Figure 11A:
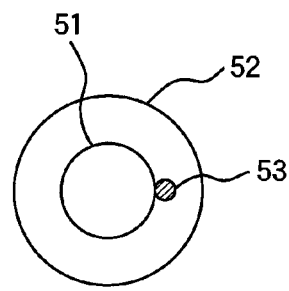
FIGS. 11A and 11B illustrate examples in which optical fiber that detects line abnormalities is laid along a line.
Figure 11B:
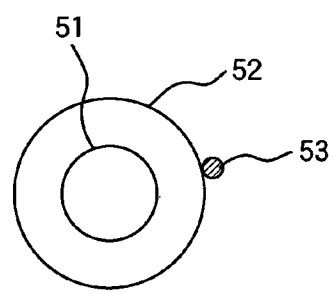
Figure 12:
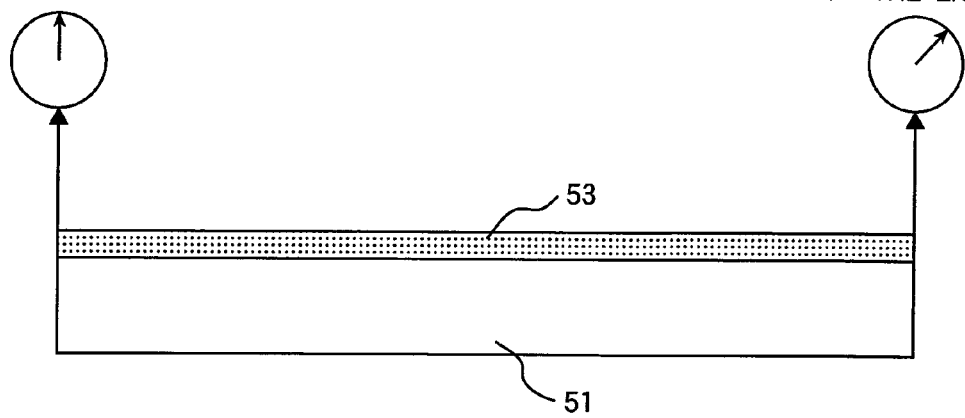
FIG. 12 illustrates how the optical fiber laid along the line detects a line abnormality.

The failure detectors a to h in FIG. 9 can also be configured by use of optical fiber. Specifically, as shown in FIG. 11A or 11B, an optical fiber 53 is laid together with the line L on the surface of the conductor 51 or protective sheath 52 of the line L. Light with a phase angle of θ1 is entered from an end of the optical fiber 53 and a phase angle θ2 of the light output from the other end is measured, as shown in FIG. 12. When the measurement of θ2 deviates from a preset value, the line is determined to have an abnormality.

Fifth Example

As another embodiment of the abnormality detector 21 in FIG. 1, the transmission capacities of the lines L-1 to L-3 can be used to detect a line abnormality. Specifically, the transmission capacities of the lines L-1 to L-3 at normal time are prestored in the database in the server S-1. When an unusual situation is detected, the transmission capacity measured by the abnormality detector 21 for the line is compared with a reference value in the database to determine whether the line is normal or abnormal.

What is claimed is:

1. A power supply system, comprising:
   a plurality of electric transmission/distribution power lines which constitute a plurality of regional-scale power systems, respectively;
   a plurality of regional-scale power generating plants arranged to supply electric power to the plurality of electric transmission/distribution power lines, respectively;
   a plurality of abnormality detectors disposed in the plurality of electric transmission/distribution power lines and the plurality of regional-scale power generating plants, respectively; and
   a server disposed so that the server is capable of communicating through redundant communication media with a user terminal at a user site which is capable of receiving power from a local small-scale power system as well as the plurality of regional-scale power systems, including one regional-scale power system selected by making a switchover among the plurality of regional-scale power systems; wherein:
   the server collects information about abnormalities caused in the plurality of regional-scale power systems through other redundant communication media from the plurality of abnormality detectors disposed in the plurality of regional-scale power generating plants, each of which is part of one of the plurality of regional-scale power systems, and on the plurality of electric transmission/distribution power lines, each of which is also part of one of the plurality of regional-scale power systems;
   the server determines whether the regional-scale power system from which the user is currently receiving power is normal or abnormal; and
   if the regional-scale power system is abnormal, the server sends, to the user terminal, information about normal regional-scale power systems from which the user is able to receive power.

2. The power supply system according to claim 1, wherein the server determines whether the regional-scale power system from which the user is currently receiving power is normal or abnormal, according to a request from the user terminal; and if the regional-scale power system is abnormal, the server sends, to the user terminal, information about a normal regional-scale power system from which the user is able to receive power.

3. The power supply system according to claim 1, wherein:
   the plurality of regional-scale power systems are structured so that they are mutually capable of sending and receiving power; and
   a switching device is provided at the user site, by which one of a plurality of lead-in lines that are respectively connected to the plurality of regional-scale power systems is selected so as to receive power.

4. The power supply system according to claim 3, wherein if the regional-scale power system from which the user is currently receiving power is abnormal, the server determines whether power is capable of being supplied to one of the plurality of lead-in lines at the user site by combining one of the normal regional-scale power systems, according to the abnormality information.

5. The power supply system according to claim 3, wherein the server sends, to the user terminal, information about a power supply capability by which power is capable of being supplied to the user as a result of combining the normal regional-scale power system.

6. The power supply system according to claim 1, wherein the server obtains a predicted recovery time taken to restore the abnormal regional-scale power system according to the abnormality information and sends the predicted recovery time to the user terminal.

7. The power supply system according to claim 6, wherein the server has a database that stores a restart time of each of the regional-scale power generating plants and a predicted recovery time that is preset for each type of abnormality, and the predicted recovery time of the abnormal regional-scale power system is obtained from contents of the database.

8. The power supply system according to claim 6, wherein the server has a database that stores a predicted recovery time preset for each type of abnormality on the electric transmission/distribution lines as well as the severity degrees of the electric transmission/distribution lines, and the predicted recovery time of the abnormal regional-scale power system is obtained from contents of the database.

9. The power supply system according to claim 6, wherein the database stores information used to reduce the predicted recovery time for a plurality of abnormalities related to the same electric transmission/distribution line.

10. The power supply system according to claim 1, wherein the abnormality detector related to the electric transmission/distribution line detects an abnormality on the electric transmission/distribution line from at least one of information about the position of a detector distributed on the electric transmission/distribution line, information about a temperature near the electric transmission/distribution line, information about a change in phase of light in the interior of optical fiber provided near the electric transmission/distribution line, and information about a change in current and voltage, including a protective relay operation.

11. A power supply system, wherein:
   a server is disposed so that the server is capable of communicating through redundant communication media with a user terminal at a user site which is capable of receiving power from one power system selected by making a switchover among a plurality of power systems;
   the server collects information about abnormalities caused in the plurality of power systems through other redundant communication media from abnormality detectors disposed in a plurality of power generating plants, each of which is part of one of the plurality of power systems, and on a plurality of electric transmission/distribution lines, each of which is also part of one of the plurality of power systems;

the server determines whether the power system from which the user is currently receiving power is normal or abnormal; and if the power system is abnormal, the server sends, to the user terminal, information about normal power systems from which the user is able to receive power, wherein:

the abnormality detector related to the electric transmission/distribution line is a position detector which is disposed on a utility pole that supports the electric transmission/distribution line or on the ground above a culvert in which the electric transmission/distribution line is laid; and the position detector communicates with a global positioning system (GPS) to obtain the latitude and longitude of the position detector so that the position detector recognizes damage on the electric transmission/distribution line when a difference from a prestored reference position exceeds a threshold.

12. A power supply system, wherein:

a server is disposed so that the server is capable of communicating through redundant communication media with a user terminal at a user site which is capable of receiving power from one power system selected by making a switchover among a plurality of power systems;

the server collects information about abnormalities caused in the plurality of power systems through other redundant communication media from abnormality detectors disposed in a plurality of power generating plants, each of which is part of one of the plurality of power systems, and on a plurality of electric transmission/distribution lines, each of which is also part of one of the plurality of power systems;

the server determines whether the power system from which the user is currently receiving power is normal or abnormal; and if the power system is abnormal, the server sends, to the user terminal, information about normal power systems from which the user is able to receive power, wherein:

the abnormality detector related to the electric transmission/distribution line is one of a plurality of position detectors which are disposed on utility poles that support the electric transmission/distribution line or on the ground above a culvert in which the electric transmission/distribution line is laid; and the position detector recognizes damage on the electric transmission/distribution line when a deviation from a prestored reference distance among the position detectors exceeds a threshold.

13. A power supply system, wherein:

a server is disposed so that the server is capable of communicating through redundant communication media with a user terminal at a user site which is capable of receiving power from one power system selected by making a switchover among a plurality of power systems;

the server collects information about abnormalities caused in the plurality of power systems through other redundant communication media from abnormality detectors disposed in a plurality of power generating plants, each of which is part of one of the plurality of power systems, and on a plurality of electric transmission/distribution lines, each of which is also part of one of the plurality of power systems;

the server determines whether the power system from which the user is currently receiving power is normal or abnormal; and if the power system is abnormal, the server sends, to the user terminal, information about normal power systems from which the user is able to receive power, wherein:

the abnormality detector related to the electric transmission/distribution line is one of a plurality of position detectors which are disposed on utility poles that support the electric transmission/distribution line or on the ground above a culvert in which the electric transmission/distribution line is laid; and when the position detectors move, it is recognized that damage occurs on the electric transmission/distribution line at the position of a position detector that moves in a direction different from the movement of other position detectors.

14. A power supply system, wherein:

a server is disposed so that the server is capable of communicating through redundant communication media with a user terminal at a user site which is capable of receiving power from one power system selected by making a switchover among a plurality of power systems;

the server collects information about abnormalities caused in the plurality of power systems through other redundant communication media from abnormality detectors disposed in a plurality of power generating plants, each of which is part of one of the plurality of power systems, and on a plurality of electric transmission/distribution lines, each of which is also part of one of the plurality of power systems;

the server determines whether the power system from which the user is currently receiving power is normal or abnormal; and if the power system is abnormal, the server sends, to the user terminal, information about normal cower systems from which the user is able to receive power, wherein:

the abnormality detector related to the electric transmission/distribution line comprises a position detector and a radio signal detector, the position detector being disposed on a utility pole that supports the electric transmission/distribution line or on the ground above a culvert in which the electric transmission/distribution line is laid, and generating a radio signal, the radio signal detector detecting the radio signal generated by the position detector; and when the intensity of the radio signal received by the radio signal detector falls below a prestored threshold, it is recognized that damage occurs on the electric transmission/distribution line at the position of the position detector.

15. The power supply system according to claim 1, wherein:

the abnormality detector related to the electric transmission/distribution line comprises a detector disposed on a utility pole that supports the electric transmission/distribution line or on the ground above a culvert in which the electric transmission/distribution line is laid, the detector measuring a temperature of or near the electric transmission/distribution line; and when a temperature higher than an upper limit of ordinary values in a prestored range is measured, it is recognized that damage occurs on the electric transmission/distribution line.

16. A power supply system, wherein:

a server is disposed so that the server is capable of communicating through redundant communication media with a user terminal at a user site which is capable of receiving power from one power system selected by making a switchover among a plurality of power systems;

the server collects information about abnormalities caused in the plurality of power systems through other redundant communication media from abnormality detectors disposed in a plurality of power generating plants, each of which is part of one of the plurality of power systems, and on a plurality of electric transmission/distribution lines, each of which is also part of one of the plurality of power systems;

the server determines whether the power system from which the user is currently receiving power is normal or abnormal; and if the power system is abnormal, the server sends, to the user terminal, information about normal power systems from which the user is able to receive power, wherein:

optical fiber is laid along the electric transmission/distribution line;

the abnormality detector related to the electric transmission/distribution line comprises a generator and a receiver, which respectively generate and receive light, disposed on a utility pole that supports the electric transmission/distribution line or on the ground above a culvert in which the electric transmission/distribution line is laid; and when the phase of light received by the receiver changes from a prestored value, it is recognized that damage occurs on the electric transmission/distribution line.

17. The power supply system according to claim 3, wherein when the regional-scale power system from which power is currently being received is abnormal, the user terminal displays on a display screen information, which is sent from the server and is about a plurality of normal regional-scale power systems from which the user is able to receive power; generates a sound such as a voice or an alarm and provides a display on the display screen to ask the user to select one of the plurality of regional-scale power systems from which the user is able to receive power; switches the regional-scale power system by use of a switching device; and notifies the server of the regional-scale power system selected by the user.

18. A power supply system, wherein:

a server is disposed so that the server is capable of communicating through redundant communication media with a user terminal at a user site which is capable of receiving power from one power system selected by making a switchover among a plurality of power systems;

the server collects information about abnormalities caused in the plurality of power systems through other redundant communication media from abnormality detectors disposed in a plurality of power generating plants, each of which is part of one of the plurality of power systems, and on a plurality of electric transmission/distribution lines, each of which is also part of one of the plurality of power systems;

the server determines whether the power system from which the user is currently receiving power is normal or abnormal; and if the power system is abnormal, the server sends, to the user terminal, information about normal power systems from which the user is able to receive power, wherein the plurality of power systems are structured so that they are mutually capable of sending and receiving power; and a switching device is provided at the user site, by which one of a plurality of lead-in lines that are respectively connected to the plurality of power systems is selected so as to receive power, wherein when the power system from which power is currently being received is abnormal, the user terminal displays on a display screen information, which is sent from the server and is about a plurality of normal power systems from which the user is able to receive power; generates a sound such as a voice or an alarm and provides a display on the display screen to ask the user to select one of the plurality of power systems from which the user is able to receive power; switches the power system by use of a switching device; and notifies the server of the power system selected by the user, and wherein if the user does not make a notification of the power system selected by the user from the user terminal within a predetermined time, the server determines that the user has an abnormality and sends a message to the user terminal to check for safety; and if there is also no response to the message, the server notifies a related rescuer organization.

* * * * *